(12) United States Patent
Burger

(10) Patent No.: US 11,628,605 B2
(45) Date of Patent: Apr. 18, 2023

(54) METHOD FOR PRODUCING A SHAPED PLASTIC PART HAVING A DECORATED SURFACE

(71) Applicant: LEONHARD KURZ Stiftung & Co. KG, Fürth (DE)

(72) Inventor: Harald Burger, Nuremberg (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 479 days.

(21) Appl. No.: 16/483,154

(22) PCT Filed: Jan. 31, 2018

(86) PCT No.: PCT/EP2018/052438
§ 371 (c)(1),
(2) Date: Aug. 2, 2019

(87) PCT Pub. No.: WO2018/145977
PCT Pub. Date: Aug. 16, 2018

(65) Prior Publication Data
US 2020/0269480 A1    Aug. 27, 2020

(30) Foreign Application Priority Data
Feb. 9, 2017    (DE) ..................... 10 2017 102 541.3

(51) Int. Cl.
*B29C 45/14*          (2006.01)
*B29C 45/00*          (2006.01)
(Continued)

(52) U.S. Cl.
CPC .... *B29C 45/14778* (2013.01); *B29C 45/0053* (2013.01); *B29C 59/002* (2013.01);
(Continued)

(58) Field of Classification Search
None
See application file for complete search history.

(56) References Cited

U.S. PATENT DOCUMENTS 5,604,006 A * 2/1997 Ponchaud ......... B29C 45/14811
                                                264/130
6,180,207 B1 * 1/2001 Preisler ............... B29C 43/3697
                                                428/209

(Continued)

FOREIGN PATENT DOCUMENTS

CN          1213265 C      8/2005
CN        101115630 A      1/2008
(Continued)

*Primary Examiner* — Edmund H Lee
(74) *Attorney, Agent, or Firm* — Hoffmann & Baron, LLP

(57) ABSTRACT

A method for producing a shaped plastic part having a decorated surface, having the steps of:
  providing a plastic intermediate product having an injection-molded part and at least a first decorative ply of a first stamping film
  providing a second stamping film with a second decorative ply,
  hot stamping the second stamping film onto the plastic intermediate product and/or onto the injection-molded part.
A shaped plastic part including an injection-molded part with at least a first and a second region of surface, a first decorative ply and a second decorative ply, wherein the first decorative ply is arranged at least in the first region of surface and the second decorative ply is arranged at least in the second region of surface.

19 Claims, 3 Drawing Sheets

(51) Int. Cl.
  *B29C 59/00* (2006.01)
  *B29C 59/02* (2006.01)
  *B29C 63/04* (2006.01)

(52) U.S. Cl.
  CPC .............. *B29C 59/02* (2013.01); *B29C 63/04* (2013.01); *B29C 2045/0079* (2013.01)

(56) References Cited

U.S. PATENT DOCUMENTS

| | | | |
|---|---|---|---|
| 6,398,897 B1* | 6/2002 | Preisler | B29C 45/1418 264/254 |
| 7,906,054 B2* | 3/2011 | Hirschfelder | B29C 45/1418 264/254 |
| 9,637,065 B2 | 5/2017 | Kruppa et al. | |
| 2002/0089088 A1* | 7/2002 | Ils | B29C 45/0055 264/296 |
| 2007/0160831 A1* | 7/2007 | Hsieh | B29C 45/14811 428/409 |
| 2008/0213541 A1 | 9/2008 | Schilling et al. | |
| 2009/0183331 A1* | 7/2009 | Gross | A46B 15/0055 15/167.1 |
| 2010/0101037 A1* | 4/2010 | Gross | C23C 14/24 264/274 |
| 2010/0196651 A1 | 8/2010 | Liao et al. | |
| 2012/0156445 A1* | 6/2012 | Schmidt | B32B 27/08 156/247 |
| 2014/0177057 A1 | 6/2014 | Brehm et al. | |
| 2015/0239159 A1 | 8/2015 | Leonhardt et al. | |
| 2017/0144344 A1 | 5/2017 | Schmidt et al. | |

FOREIGN PATENT DOCUMENTS

| | | |
|---|---|---|
| CN | 101369664 A | 2/2009 |
| CN | 101677495 A | 3/2010 |
| CN | 103702841 A | 4/2014 |
| CN | 203652265 U | 6/2014 |
| DE | 102009031478 A1 | 1/2011 |
| DE | 102010018591 A1 | 10/2011 |
| DE | 102012203412 A1 | 9/2012 |
| DE | 102013213629 A1 | 1/2015 |
| DE | 102015109642 A1 | 12/2016 |
| JP | H929880 | 2/1997 |
| JP | H0929880 A | 2/1997 |
| JP | H11192635 | 7/1999 |
| JP | H11192635 A | 7/1999 |
| JP | 2006002993 A | 1/2006 |
| JP | 2006002993 | 5/2006 |

\* cited by examiner

METHOD FOR PRODUCING A SHAPED PLASTIC PART HAVING A DECORATED SURFACE

This application claims priority based on an International Application filed under the Patent Cooperation Treaty, PCT/EP2018/052438, filed Jan. 31, 2018, which claims priority to DE 102017102541.3, filed Feb. 9, 2017.

BACKGROUND OF THE INVENTION

The invention relates to a method for producing a shaped plastic part having a decorated surface, and a shaped plastic part.

To integrate surface decoration of plastic parts into their production, plastic films are used as laminates or as layers that can be transferred from a carrier ply, in particular decorative plies. Plastic parts decorated in such a way are used, for example, for automotive interior parts such as door trims, trims in dashboard panels and center console cover panels in automobile manufacture, for decorative trims on television sets in the consumer electronics field, for housings of portable devices such as mobile telephones in the telecommunications field, or for containers in general.

In particular the IMD method (IMD=In-Mold Decoration) is used in the surface decoration of plastic parts. In the IMD method a film, in particular with at least one carrier ply and a decorative ply that can be detached from the carrier ply, is placed inside an opened injection mold. After the injection mold has been closed, the film is back injection molded with a molten plastic, wherein the decorative ply bonds to the molten plastic under pressure and temperature to form a secure join. After the mold has been opened and the molten plastic has cooled down, the finished decorated shaped part can be removed, wherein the carrier ply is detached from the decorated injection-molded part.

A disadvantage in the IMD method is that there are restrictions with respect to the geometry of the shaped part, as a good quality can only be ensured when the strain on the film is not too great. This means that shaped parts can be reliably produced in the IMD method only if the shaped parts have bulges that are comparatively small locally and/or overall and/or radii that are not too small.

Furthermore, hot stamping is known for decorating shaped parts or substrates. Here, a decoration, in particular at least a part of at least one decorative ply, is transferred from a carrier ply to a surface to be stamped by means of a heated stamp or a wheel which exerts pressure on the carrier ply over a particular period of time.

However, hot stamping also has limitations. Thus, because of the design limitations for the necessary contact between stamping die surface or stamping wheel lining and substrate for the exertion of the stamping pressure and for the sufficient action of heat, not every geometry can be decorated.

SUMMARY OF THE INVENTION

The object of the invention now is to specify an improved method with which shaped parts—even with complicated or difficult geometries—can be reliably decorated.

This is achieved by a method for producing a shaped plastic part having a decorated surface according to the present invention, and by a shaped plastic part according to the present invention.

This object is achieved by a method for producing a shaped plastic part having a decorated surface, having the steps of:
providing a plastic intermediate product having an injection-molded part and at least a first decorative ply, wherein the decorative ply is preferably arranged at least in a first region of surface of the injection-molded part,
providing a second stamping film with a second decorative ply,
hot stamping the second stamping film onto the plastic intermediate product and/or onto the injection-molded part preferably at least in a second region of surface of the injection-molded part.

The individual method steps preferably take place in the specified sequence.

The object is furthermore achieved with a shaped plastic part, in particular which can be obtained by a method according to one of the preceding claims, comprising an injection-molded part with at least a first and a second region of surface, a first decorative ply and a second decorative ply, wherein the first decorative ply is arranged at least in the first region of surface and the second decorative ply is arranged at least in the second region of surface.

It has been shown that through the invention it is possible to decorate or obtain even shaped parts which previously could not be produced or could only be produced with difficulty or else had several deficiencies in quality, in particular with respect to the optical effect. Through the invention it is even possible also to decorate injection-molded parts or to obtain decorated shaped parts which have an edge or corner radius smaller than 0.3 mm, preferably smaller than 0.2 mm. Such injection-molded parts can now be provided with a decorative ply even in the region of the edge or corner radii.

Furthermore, through the present invention the decoration of shaped parts is in particular not limited just to small decoration depths. The decoration can now also extend over a greater decoration depth. Within the meaning of the invention, by decoration depth is meant in particular the maximum Z-depth of an injection mold on the decoration side or decoration cavity. The decoration depth depends in particular on the smallest corner or edge radius of the mold geometry present. The decoration depth is preferably approximately as great as the smallest corner or edge radius of the mold geometry present. Thus if, for example, a corner or edge radius of the mold geometry is approx. 1 mm, then the maximum achievable decoration depth of the mold geometry is also only approx. 1 mm.

In addition, even shaped parts with a lateral face, at least pieces of which are cylindrically curved, can be produced with the method, wherein the lateral face can have a maximum slope or conicity of up to 10°, preferably up to 5°.

The first decorative ply is preferably a part or constituent of a first stamping film. The decorative plies can be formed both single-layered and multi-layered. The second stamping film or the second decorative ply of the second stamping film is preferably applied to the plastic intermediate product in such a way that the second stamping film or the second decorative ply directly adjoins the first decorative ply. This is intended to mean in particular that there are no gaps between the decorative plies. This results in the decorative plies touching. A seamless transition of the decorative plies into each other can hereby be achieved. When the decorated shaped part is observed, the impression is hereby created that a continuous decoration is present. A high-quality shaped part is thus obtained in optical terms. In particular if the decorative plies are formed identical, the decorated shaped part has a homogeneous impression. It appears as if the shaped part has an uninterrupted or a single decoration.

The second stamping film or the second decorative ply is advantageously applied to the plastic intermediate product in such a way that the second stamping film or the second decorative ply overlaps the first decorative ply in regions. In particular, it is hereby ensured that the injection-molded part is not visible. In the manufacture of the injection-molded part, optical aspects or properties of the manufactured injection-molded part, such as for example coloring, surface phenomena such as streaks, differences in gloss and/or jetting, thus play a subordinate role, which makes the manufacture of the injection-molded part easier and also cheaper. The thickness of the decorative plies is so small relative to the thickness of the injection-molded part that in principle it is insignificant for the shaped plastic part in terms of thickness and is fundamentally negligible. The thickness of the injection-molded part substantially corresponds to the thickness of the shaped plastic part. If there is a partial overlapping of the decorative plies, then in principle an observer cannot recognize this or can only recognize it using aids, because of the thin layer thicknesses.

In particular, the second stamping film or the second decorative ply of the second stamping film overlaps the first decorative ply by at most 5 mm, preferably by at most 2 mm, particularly preferably by at most 1 mm. However, it is also entirely conceivable that the first decorative ply overlaps the second decorative ply at least in regions.

The plastic intermediate product is preferably produced by at least the following steps:
  arranging or introducing the first stamping film with the first decorative ply in or into a cavity of an injection mold,
  back injection molding the first stamping film at least in regions with a plastic compound, with the result that preferably a first stamping film and/or the first decorative ply is/are joined to the injection-molded part at least in the first region of surface of the injection-molded part.

Such a procedure has the advantage that the production of the injection-molded part and the decoration of the injection-molded part take place in one method step. This is thus a very efficient and economic method.

However, it is also possible for the plastic intermediate product to be produced by at least the following steps:
  producing the injection-molded part by means of injection molding,
  arranging a first stamping film with the first decorative ply over at least the first region of surface of the injection-molded part,
  hot stamping the first stamping film and/or the first decorative ply with the injection-molded part, with the result that preferably the first stamping film and/or the first decorative ply is/are joined to the injection-molded part at least in the first region of surface of the injection-molded part.

It is advantageous here if the first stamping film is pre-heated, in particular pre-heated uniformly. Due to the pre-heating, the material of the stamping film, in particular the carrier ply, stretches, whereby a reliable elasticity or stretching behavior can be ensured.

It is advantageous here if the first stamping film is suctioned onto and/or over the injection-molded part by means of vacuum suction, in particular during and/or after the pre-heating. Due to the suctioning the first stamping film rests particularly tightly against the injection-molded part.

The first and/or second stamping film preferably has a carrier ply. The carrier ply ensures in particular that the stamping film has a sufficient stability and can thus be processed safely. The carrier ply preferably consists of PET and/or polypropylene, polystyrene, PVC, PMMA, ABS and/or polyamide. In particular, the carrier ply has a layer thickness of from 6 µm to 250 µm, preferably a layer thickness of from 12 µm to 100 µm, particularly preferably a layer thickness of between 19 µm and 75 µm. Ideally, the layer thickness of the carrier ply of the first stamping film is approx. 75 µm and/or the carrier ply of the second stamping film is approx. 19 µm.

The carrier ply of the first and/or of the second stamping film is advantageously detached from the first or second decorative ply. The carrier ply is detached in particular after the first decorative ply has been securely joined to the injection-molded part at least in regions or after the second decorative ply has been securely joined to the plastic intermediate product or the injection-molded part at least in regions. Due to the detachment of the carrier ply, the decorative ply represents the uppermost layer of the shaped part and thus ensures, among other things, the optical impression of the shaped part.

The first and/or second stamping film preferably has a detachment layer. The detachment layer comprises in particular wax, wax-containing compounds, fatty acid esters and/or montanic acid esters. The detachment layer can have a layer thickness of from 0.001 µm to 1 µm, preferably a layer thickness of from 0.001 µm to 0.1 µm, particularly preferably a layer thickness of approx. 0.01 µm.

In particular, the first and/or second decorative ply has a metallization. The metallization preferably comprises aluminum. The metallization can also comprise copper, chromium or tin. In particular, tin is formed as a metallized, electrically non-conductive layer. The tin layer is preferably divided into regions galvanically separated from each other which grow in island growth mode in particular during a vacuum metallization. The islands forming in the process are not in electrical contact with each other. Such electrically non-conductive, vacuum-metallized layers are also called NCVM layers (NCVM=Non Conductive Vacuum Metallized). This division is not recognizable or is barely recognizable any longer for the human observer and thus the optical appearance is not influenced by the division. The metallization can have a layer thickness preferably of from 5 nm to 100 nm, in particular preferably a layer thickness of from 5 nm to 50 nm, particularly preferably a layer thickness of approx. 40 nm.

The first and/or second decorative ply preferably comprise one or more layers. In an embodiment the first and/or second decorative ply can also have at least one color layer. The color layers can be dyed differently, can be formed transparent and/or opaque and/or can also be separated by one or more further layers, in particular transparent layers. The color layers comprise in particular pigments, in particular also optically variable pigments and/or metallic pigments and/or dyes. The color layer preferably has a layer thickness of from 0.4 µm to 10 µm, in particular preferably a layer thickness of from 0.6 µm to 3 µm. Ideally, the color layer of the first decorative ply has a layer thickness of approx. 1.6 µm and the color layer of the second decorative ply has a layer thickness of approx. 1.8 µm. The color layers can for example be printed, in particular by means of gravure printing, screen printing, flexographic printing or digital printing methods such as inkjet printing or xerographic printing methods.

Further, the first and/or second decorative ply can also comprise one or more reflective layers, which are preferably formed opaque, translucent and/or partially. In particular, the reflective layers can consist of metals and/or HRI layers (HRI=High Refractive Index), thus layers with a high refractive index, in particular higher than 1.5. For example aluminum, chromium, tin or copper or alloys thereof come into consideration as metals. For example ZnS or $SiO_2$ come into consideration as HRI layers. Further, the decorative layer can also have one or more optically active relief structures, in particular diffractive structures and/or holograms and/or refractive structures and/or matte structures. At least one reflective layer is arranged directly on the relief structure at least in regions.

However, in principle it is also conceivable that the first and/or second decorative ply has at least one functional layer. Functional layers are, for example, electrically conductive layers (metal, ITO=indium tin oxide), electrically semi-conductive layers (e.g. semi-conductor polymers), electrically non-conductive layers (electrically insulating varnish layers), optically matting or anti-reflective layers (e.g. microscopic matte structures), anti-adhesion layers, anti-dirt layers and/or anti-static layers, and/or haptically or tactilely specifically perceptible layers, for example a soft-touch layer.

The first and/or second decorative ply preferably has an adhesion-promoter layer. The layer thickness of the adhesion-promoter layer can be between 0.05 μm and 5 μm, preferably between 0.4 μm and 0.6 μm and particularly preferably approx. 0.2 μm.

In particular, the first and/or second decorative ply has a protective layer. The protective layer has in particular a layer thickness of from 0.4 μm to 10 μm, preferably a layer thickness of from 0.6 μm to 2 μm, in particular preferably a layer thickness of approx. 0.9 μm. It is advantageous if only the second decorative ply has a protective layer.

The protective layer can be formed as a protective varnish made of a PMMA-based varnish with a layer thickness in the range of from 2 μm to 5 μm. The protective varnish can also consist of a radiation-curing dual-cure varnish. This dual-cure varnish can be thermally pre-crosslinked in a first step during and/or after application in liquid form and can be radically post-crosslinked in a second step after the processing of the transfer film, in particular via high-energy radiation, preferably UV radiation. Dual-cure varnishes of this type can consist of various polymers or oligomers, which preferably have unsaturated acrylate or methacrylate groups. These functional groups can be radically crosslinked with each other in the above-named second step. For the thermal pre-crosslinking in the first step, at least two or more alcohol groups must also be present in the case of these polymers or oligomers. These alcohol groups can be crosslinked with multifunctional isocyanates or melamine formaldehyde resins. Various UV raw materials such as epoxy acrylates, polyether acrylates, polyester acrylates and in particular acrylate acrylates come into consideration as unsaturated oligomers or polymers. Both blocked and unblocked group members based on TDI (TDI=toluene-2,4-diisocyanate), HDI (HDI=hexamethylene diisocyanate) or IPDI (IPDI=isophorone diisocyanate) come into consideration as isocyanate. The melamine crosslinkers can be fully etherified versions, can be imino types or can represent benzoguanamine group members. Many of these protective varnishes would be insufficiently deformable and thus insufficiently deep-drawable without the deep-drawing membrane.

It can also be provided that the protective layer is formed as a protective varnish made of a varnish based on PMMA (PMMA=polymethyl methacrylate) or a varnish based on a mixture of PVDF (PVDF=polyvinylidene fluoride) and PMMA, in particular with a layer thickness in the range of from 15 μm to 30 μm. These varnishes bring the mechanical brittleness needed for a transfer film and for being able to sufficiently precisely and cleanly stamp it out or separate it at the desired outer limits of the transferred regions of surface of the transfer plies.

The first and/or second decorative ply preferably has a single-layered or multi-layered adhesive layer. The adhesive layer in particular ensures a sufficiently good adhesion between the decorative plies and the injection-molded part and/or between the decorative plies. The layer thickness of the adhesive layer is preferably between 0.4 μm and 10 μm, particularly preferably between 0.6 μm and 3 μm. It is advantageous if the adhesive layer of the first decorative ply is approx. 1.9 μm and/or the adhesive layer of the second decorative ply is approx. 2.2 μm. It can be provided that the adhesive layer is formed with a layer thickness in the range of from 1 μm to 5 μm. Raw materials coming into consideration for the adhesive layer are PMMA, PVC, polyester, polyurethanes, chlorinated polyolefins, polypropylene, epoxy resins or polyurethane polyols, in particular in combination with deactivated isocyanates. The adhesive layer can moreover contain inorganic fillers.

The adhesive layers and the protective layers, in particular the adhesive and protective layers bordering each other on the produced shaped part or on the injection-molded part, are advantageously formed such that they adhere sufficiently well to each other. An optimum join between the decorative plies can hereby be achieved, with the result that it can be ensured that a clean and reliable sealing of the decorative plies is effected and the injection-molded part is covered by the decorative plies in the seam region, safe from the environment. This can be achieved in particular in that the protective layer and the adhesive layer, in particular the adhesive layer of the second decorative ply and the protective layer of the first decorative ply, are constructed with related binders. For this, the layers can have, for example, acrylate binders.

The assessment of the adhesion at the seams, in particular in the overlap region of the first and second decorative ply, can occur in a different way and in particular comprises a qualitative evaluation. In particular the adhesion test and the grid test have proved to be suitable. In the adhesion test a Tesa 4104 film with a width of 14 mm is used, which is pressed onto the decorated surface on a test part bubble-free by rubbing the tip of a thumb over it three times. After the rubbing, the Tesa film is rapidly detached manually "away from the body" at an angle of from 45° to 60°. If, after the test, 95% of the total varnish is still present on the test part, the decoration is to be denoted "good".

In the grid test a square structure with a grid cutter (in particular with 6 cutting edges) is cut into the decorated surface of the test part, whereby a number of squares form in the layer or in the surface. A Tesa 4104 film with a width of 14 mm is then pressed onto the cut area bubble-free by rubbing the tip of a thumb over it 3 times. After the rubbing, the Tesa film is likewise rapidly detached manually "away from the body" at an angle of from 45° to 60°. The adhesion is assessed on the basis of the total varnish or particles of the layer adhering to the Tesa film.

It is advantageous if the second stamping film and/or the first stamping film are formed such that they can be imprinted flake-free. By flakes are meant in the present case in particular very small splintering particles which can form when regions of the decorative ply are torn out during the stamping transfer and are significantly disruptive in the case of a possible subsequent printing process under certain circumstances, as they can lead to an unclean printing.

In an advantageous embodiment the first and second decorative plies are formed identical, preferably have the same color layer and/or metallization. A shaped part which has a homogeneous appearance and thus has a high-quality look is hereby obtained. Although the injection-molded part is decorated with several decorative plies arranged in particular adjacent to each other, it has a uniform surface, with the result that the observer believes it is a single coherent decoration or decorative ply. The shaped plastic part can thus be used as a high-value product.

In another embodiment the first and second decorative plies are formed different and have in particular a different color and/or a different metallization. A shaped part which also has a different appearance on differently arranged part-surfaces is hereby obtained. It can be provided that the first and second decorative plies are optically clearly distinguishable from each other and have for example different colors, motifs, patterns, writing or the like. For example, the first decorative ply can have a full-surface metallization and the second decorative ply can have a colored and/or metallized pattern, or the first decorative ply has a colored and/or metallized pattern and the second decorative ply has a full-surface metallization.

Further examples are hues and/or patterns of the first decorative ply optically matched to each other in particular in relation to contrast and/or color saturation and/or hue in a first hue and/or a first pattern, and the second decorative ply in a second hue and/or a second pattern, wherein the two hues and/or patterns preferably harmonize optically. For example, these can be brown shades matching each other or wood decorations or marble decorations matching each other.

Further, it is possible for such color-matched first and second decorative plies to be supplemented further with corresponding, in particular partially arranged, matting and/or glossing functional layers and/or with soft-touch functional layers. It is also possible for these, in particular partially arranged, matting and/or glossing functional layers and/or soft-touch functional layers to be arranged registration-accurate or register-accurate relative to patterns of the first and/or second decorative ply.

However, it can also be provided that the first and second decorative plies differ from each other optically only slightly and for example have only a slightly differing lightness and/or chromaticity and/or coarseness and/or matteness and/or transparency and/or tactility and/or a slightly differing reflecting power and/or absorbing power. The differently arranged partial surfaces of the shaped plastic part can thereby for example be subtly contrasted with each other. However, it is also possible for the differently arranged partial surfaces of the shaped plastic part to thereby be matched to each other, because for example the partial surfaces are perceived in each case at slightly different angles when observed. A particularly uniform appearance of the entire shaped plastic part can be achieved through the slight variation of one of the above-named surface parameters.

If the first and second decorative plies have in each case motifs, patterns, writing or the like, it can be provided to arrange or apply the first and second decorative plies registered relative to each other on the shaped plastic part. It can thereby be achieved that the motifs, patterns, writing or the like merge into each other from the first decorative ply to the second decorative ply, in particular without a visible seam or almost without a visible seam. The optical impression of a single coherent decoration or decorative ply can thus be achieved and/or improved.

By register or registration, or register accuracy or registration accuracy, is meant a positional accuracy of two or more elements and/or layers relative to each other. The register accuracy is to vary within a predefined tolerance, which is to be as small as possible. At the same time, the register accuracy of several elements and/or layers relative to each other is an important feature in order to increase the process stability. The positionally accurate positioning can be effected in particular by means of sensory, preferably optically detectable registration marks or register marks. These registration marks or register marks can either represent special separate elements or regions or layers or themselves be part of the elements or regions or layers to be positioned.

The injection-molded part is preferably formed substantially cylindrical. However, it is also conceivable that the injection-molded part is formed rotationally symmetrical, dome-shaped, conical or frustoconical. The injection-molded part can be formed in particular as a hollow body.

Advantageously, at least one base surface and/or one top surface of the injection-molded part is decorated at least in regions, preferably substantially completely, with the first decorative ply. A shaped part or an injection-molded part with a decorated base surface and/or a decorated top surface is hereby obtained.

The top surface and/or the base surface of the injection-molded part can advantageously be formed curved at least in regions, in particular substantially completely.

The length of the curvature, in particular the distance between one side of the curvature and an opposite side of the curvature along the curvature, is preferably at most twice as long as, preferably at most 50% longer than, the shortest distance between the opposite sides of the curvature. The shortest distance is in particular the length of the projection or the length of the inverse image of the curvature. If it is a substantially cylindrical injection-molded part with a dome-shaped surface, in particular a top surface formed dome-shaped, then the diameter of the base surface of the injection-molded part in particular represents the shortest distance.

Further, it is possible for the injection-molded part to have a structuring in addition to or superposed with this curvature, wherein this structuring preferably has a maximum depth of 1000 μm, further preferably a maximum depth of 300 μm. The minimum structure period or the minimum spacing of two neighboring structure sides is advantageously approximately 10 nm.

It is possible here for the structure to represent a motif that is raised and/or sunk relative to the curvature, such as for example a logo, pattern, writing or the like. It is also possible for the structure to be formed alternatively or additionally as a matte structure and/or surface texture and/or surface wrinkling, which superposes in particular the curvature. Preferably, depending on the structure parameters chosen and/or the arrangement of the structure elements in a periodic, pseudo-random or random manner, different optically and/or haptically perceptible effects can thus be generated, wherein in particular the structures can also support the corresponding decoration, preferably the first and/or decorative ply, in terms of the optical impact or in terms of its optical effect.

For example, a matte structure and/or surface texture and/or surface wrinkling can be combined with a functional soft-touch layer and a corresponding decorative ply, in order in particular to achieve a particular optical and/or tactile look and feel.

Further, for example, a metallized decorative ply with a surface texture and/or surface wrinkling and/or otherwise advantageously formed structure can be combined such that in particular a sparkle effect or glitter effect is generated.

The structure can be present over the whole surface or also only partially. In the case of a partial application of the structure it is possible for the combination of metal mirror (without structure) and neighboring sparkle effect or glitter effect to have a particularly striking effect. A further positive side effect of such a structure on a metallized decorative ply is preferably the optical suppression or optical concealing of minor errors, e.g. micro-holes in the metallization.

At least one region of a lateral surface of the injection-molded part, preferably substantially the entire lateral surface of the injection-molded part, is preferably decorated with the second decorative ply. A shaped part or an injection-molded part with a lateral surface decorated at least in regions is hereby obtained. In particular, the second decorative ply decorates at least a part of the top and/or base surface. The second decorative ply advantageously decorates the base and/or top surface and the lateral surface at least in regions. Ideally, the second decorative ply decorates the base and/or top surface in regions and the lateral surface substantially completely.

The injection-molding process or the back injection molding is preferably effected at a temperature of from 180° C. to 350° C., particularly preferably at a temperature of from 220° C. to 280° C., and/or preferably under an injection pressure of from 800 bar to 3000 bar, particularly preferably under an injection pressure of from 1200 bar to 2200 bar, and/or preferably for an injection time of from 0.5 seconds to 30 seconds, particularly preferably for an injection time of from 0.5 seconds to 5 seconds. By injection time is meant the time between the start and end of filling the injection mold with the injection-molding material and in particular does not comprise the subsequently additionally necessary cooling time, which is dependent in particular on the wall thickness of the injection-molded part.

The hot stamping is preferably effected at a stamping temperature of from 80° C. to 250° C., particularly preferably at a stamping temperature of from 120° C. to 210° C., and/or preferably under a stamping pressure of from 1 N/mm$^2$ to 10 N/mm$^2$, particularly preferably under a stamping pressure of from 3 N/mm$^2$ to 5 N/mm$^2$, and/or preferably with a stamping force of from 1000 N to 10,000 N, particularly preferably with a stamping force of from 3000 N to 5000 N, and/or preferably at a stamping speed of from 1 m/min to 10 m/min, particularly preferably at a stamping speed of from 4 m/min to 6 m/min.

BRIEF DESCRIPTION OF THE DRAWINGS

The invention is explained by way of example below by means of several embodiment examples with the aid of the attached figures. There are shown in.

DETAILED DESCRIPTION OF THE PREFERRED EMBODIMENTS

Figure 1:
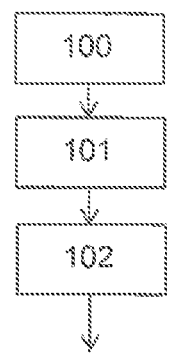
FIG. 1 a flow diagram of a method for producing a shaped plastic part.

FIG. 1 shows a flow diagram of a method for producing a shaped plastic part 1 having a decorated surface. In a step 100 a plastic intermediate product 10 having an injection-molded part 12 and at least a first decorative ply 16, in particular at least a first decorative ply 16 of a first stamping film 14, is provided. The decorative ply 16 is preferably arranged at least in a first region of surface 22 of the injection-molded part 12. In a step 101 the provision of a second stamping film 18 with a second decorative ply 24 is effected. In a step 102 the second stamping film 18 and the plastic intermediate product 10 and/or the injection-molded part 12 are then hot stamped in at least a second region of surface 24 of the injection-molded part 12. After a secure join between the second stamping film 18 and injection-molded part 12 or plastic intermediate product 10 has been brought about, a carrier ply of the second stamping film 18 is preferably detached. Due to the detachment of the carrier ply, the second decorative ply 20 represents the uppermost layer of the shaped plastic part 1 and thus substantially ensures the optical impression of the shaped plastic part 1, in particular in conjunction with the first decorative ply 16.

Figure 2:
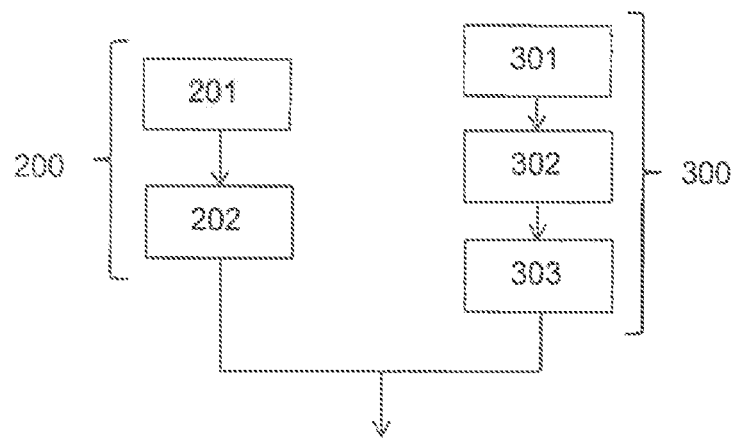
FIG. 2 a flow diagram of two possible methods for producing a plastic intermediate product FIG. 3 a schematic representation of a shaped plastic part in one embodiment FIG. 4 a schematic representation of individual method steps for producing a shaped plastic part in a further embodiment

FIG. 2 shows two possible methods 200, 300 for producing the plastic intermediate product 10. In the first method 200 the first stamping film 14 with the first decorative ply 16 is arranged in or introduced into a cavity of an injection mold 50 in a first step 201. In a subsequent step 202 the first stamping film 14 is back injection molded at least in regions with a plastic compound. The plastic intermediate product 10 forms hereby, wherein the first stamping film 14 and/or the first decorative ply 16 is/are joined to the injection-molded part 12 at least in the first region of surface 22 of the injection-molded part 12. After a join between the first stamping film 14 and the plastic compound or injection-molded part 12 has been brought about, a carrier ply of the first stamping film 14 is preferably detached from the first decorative ply 16 or from the injection-molded part 12. Due to the detachment of the carrier ply, the first decorative ply 16 now represents the uppermost layer of the plastic intermediate product 10 and thus substantially ensures the optical impression of the plastic intermediate product 10.

In the second method 300 the injection-molded part 12 is produced by means of injection molding in a first step 301. In a step 302 the first stamping film 14 with the first decorative ply 16 is then arranged over at least the first region of surface 22 of the injection-molded part 12. In a step 303 the first stamping film 14 and/or the first decorative ply 16 is/are hot stamped with the injection-molded part 12. The plastic intermediate product 10 forms hereby, wherein the first stamping film 14 and/or the first decorative ply 16 is/are joined to the injection-molded part 12 at least in the first region of surface 22 of the injection-molded part 12. After a join between the first stamping film 14 and the plastic compound or injection-molded part 12 has been brought about, the carrier ply of the first stamping film 14 is preferably detached from the first decorative ply 16 or from the injection-molded part 12. Due to the detachment of the carrier ply, the first decorative ply 16 now represents the uppermost layer of the plastic intermediate product 10 and thus substantially ensures the optical impression of the plastic intermediate product 10.

The carrier ply of the first and/or second stamping film 14, 18 ensures in particular that the stamping films 14, 18 have a sufficient stability and can thus be processed safely. The carrier ply preferably consists of PET or polypropylene, polystyrene, PVC, PMMA, ABS or polyamide. In particular, the carrier ply has a layer thickness of from 6 µm to 250 µm, preferably a layer thickness of from 12 µm to 100 µm, particularly preferably a layer thickness of from 19 µm to 75 µm. Ideally, the layer thickness of the carrier ply of the first stamping film 14 is approx. 75 µm and/or the carrier ply of the second stamping film 18 is approx. 19 µm.

The first 14 and/or second 18 stamping film preferably has a detachment layer. The detachment layer ensures a clean separation between carrier ply and the decorative plies 16, 20. The detachment layer comprises in particular wax, wax-containing compounds, fatty acid esters and/or montanic acid esters. The detachment layer can have a layer thickness of from 0.001 µm to 1 µm, preferably a layer thickness of from 0.001 µm to 0.1 µm, particularly preferably a layer thickness of approx. 0.01 µm.

Figure 3:
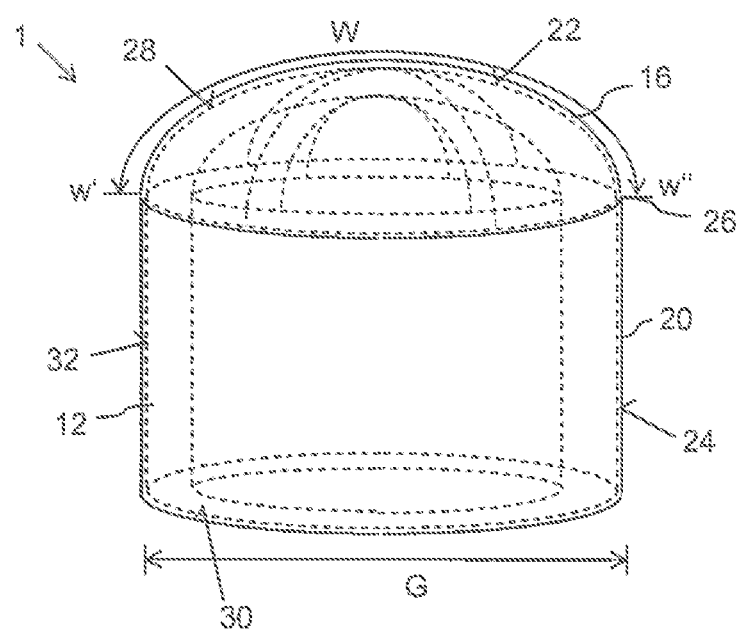

FIG. 3 shows a schematic representation of a shaped plastic part 1 in one embodiment. The shaped plastic part 1 comprises an injection-molded part 12 with at least a first 22 and a second 24 region of surface. Furthermore, the shaped plastic part 1 has a first decorative ply 16, in particular a first decorative ply 16 of a first stamping film 14, and a second decorative ply 20, in particular a second decorative ply 20 of a second stamping film 18. The first decorative ply 16 is preferably arranged at least in the first region of surface 22 and the second decorative ply 20 is arranged at least in the second region of surface 24.

The ratio of thicknesses shown in FIG. 3 between the decorative plies 16, 20 and the injection-molded part 12 is in principle not true-to-reality, as the layer thicknesses of the decorative plies 16, 20 are substantially thinner than the thickness of the injection-molded part 12. In principle they can be disregarded and virtually have no effect on the thickness of the shaped plastic part 1. The thickness of the injection-molded part 12 substantially represents the thickness of the shaped plastic part 1.

The first decorative ply 16 and the second decorative ply 20 or the second stamping film 18 coincide in particular in a seam region 26. The decorative plies 16, 20 are preferably applied to the injection-molded part 12 such that the second stamping film 18 or the second decorative ply 20 directly adjoins the first decorative ply 16. A seamless transition of the decorative plies 16, 20 into each other can hereby be achieved. When the decorated shaped plastic part 1 is observed, the impression is hereby created that a continuous or single decoration is present.

The second stamping film 18 or the second decorative ply 20 can, however, advantageously also be applied such that the second stamping film 18 or the second decorative ply 20 overlaps the first decorative ply 16 in regions. In particular, it is hereby ensured that the injection-molded part 12 is not visible. In the manufacture of the injection-molded part 12, optical aspects or properties of the manufactured injection-molded part 12, such as for example coloring, surface phenomena such as streaks, differences in gloss and/or jetting, thus play a subordinate role, which makes the manufacture of the injection-molded part 12 easier and also cheaper.

In particular, the second stamping film 18 or the second decorative ply 20 overlaps the first decorative ply 16 by at most 5 mm, preferably by at most 2 mm, particularly preferably by at most 1 mm. However, it is also thoroughly conceivable that the first decorative ply 16 overlaps the second decorative ply 20 at least in regions.

The first 16 and/or second 20 decorative ply preferably has a metallization. The metallization comprises in particular aluminum, copper, chromium and/or tin. The metallization can have a layer thickness preferably of from 5 nm to 100 nm, in particular preferably a layer thickness of from 5 nm to 50 nm, particularly preferably a layer thickness of approx. 40 nm.

The first 16 and/or second 20 decorative ply can also have a color layer. The color layer comprises in particular pigments and/or dyes. The color layer preferably has a layer thickness of from 0.4 µm to 10 µm, in particular preferably a layer thickness of from 0.6 µm to 3 µm. Ideally, the color layer of the first decorative ply 16 has a layer thickness of approx. 1.6 µm and the color layer of the second decorative ply 20 has a layer thickness of approx. 1.8 µm.

It is also conceivable that the first 16 and/or second 20 decorative ply has at least one functional layer. Functional layers are for example electrically conductive layers (metal, ITO=indium tin oxide), electrically semi-conductive layers (e.g. semi-conductor polymers), electrically non-conductive layers (electrically insulating varnish layers), optically matting or anti-reflective layers (e.g. microscopic matte structures).

The first 16 and/or second 20 decorative ply preferably has an adhesion-promoter layer. The layer thickness of the adhesion-promoter layer can be between 0.05 µm and 5 µm, preferably between 0.4 µm and 0.6 µm and particularly preferably approx. 0.2 µm.

In particular, the first 16 and/or second 20 decorative ply has a protective layer. The protective layer has in particular a layer thickness of from 0.4 µm to 10 µm, preferably a layer thickness of from 0.6 µm to 2 µm, in particular preferably a layer thickness of approx. 0.9 µm. It is advantageous if only the second decorative ply 20 has a protective layer.

The first 16 and/or second 20 decorative ply preferably has a single-layered or multi-layered adhesive layer. The adhesive layer in particular ensures a sufficiently good adhesion between the decorative plies 16, 20 and the injection-molded part 12, and/or between the decorative plies 16, 20. The layer thickness of the adhesive layer is preferably between 0.4 µm and 10 µm, particularly preferably between 0.6 µm and 3 µm. It is advantageous if the adhesive layer of the first decorative ply 16 is approx. 1.9 µm and/or the adhesive layer of the second decorative ply 20 is approx. 2.2 µm.

The adhesive layers and the protective layers, in particular the adhesive and protective layers adjoining each other on the produced shaped part 1, are advantageously formed such that they adhere to each other sufficiently well. An optimum join between the decorative plies 16, 20 can hereby be achieved, with the result that it can be ensured that a cleaner sealing of the decorative plies 16, 20 is effected and the injection-molded part 12 in particular in the seam region 26 is covered or protected by the decorative plies 16, 20, safe from the environment. This can be achieved in particular in that the protective layer and the adhesive layer, in particular the adhesive layer of the second decorative ply 20 and the protective layer of the first decorative ply 16, are constructed with related binders. For this, the layers can have acrylate binders.

Ideally, the first 16 and second 20 decorative plies are formed identical. The decorative plies 16, 20 advantageously have the same color layer and/or the same metallization. A shaped part 1 which has a homogeneous appearance and thus has a high-quality appearance overall is hereby obtained. Although the injection-molded part 12 is decorated with several decorative plies 16, 20, it has a uniform surface. The shaped plastic part 1 can thus be handled as a high-value product.

The injection-molded part 12 shown in FIG. 3 is formed substantially as a cylindrical hollow body. The injection-molded part 12 has a lateral surface 32 and a base surface 30. Furthermore, the injection-molded part 12 has a top surface 28. The top surface 28 is formed dome-shaped and has a curvature W.

Advantageously, at least the top surface 28 of the injection-molded part 12 is substantially completely decorated or covered with the first decorative ply 16. Moreover, the lateral surface 32 of the injection-molded part 12 is preferably substantially completely decorated or covered with the second decorative ply 20. Furthermore, the second decorative ply 20 can also decorate or cover the top surface 28 at least in regions.

In FIG. 3 the length of the curvature of the top surface 28 of the injection-molded part 12 is labeled with a W. W is the distance along the curvature W between one side of the curvature w' or of the injection-molded part 12 and an opposite side of the curvature w″ or of the injection-molded part 12. The distance is preferably at most twice as long as, preferably at most 50% longer than, a shortest distance between the opposite sides of the curvature. In FIG. 3 the shortest distance is the diameter of the base surface 30 of the injection-molded part 12, it is labeled with a G.

Figure 4:
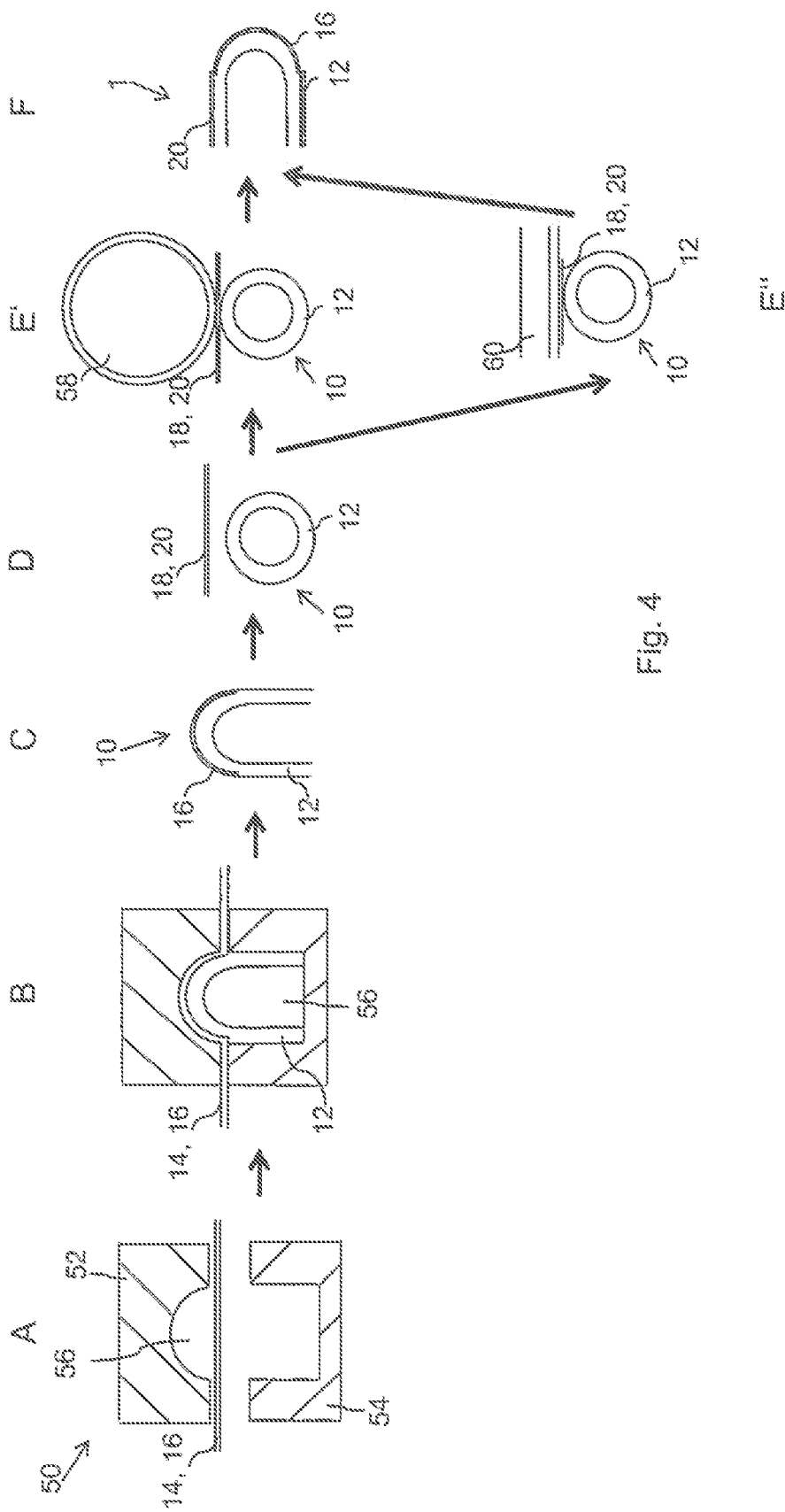

FIG. 4 showed a schematic representation of individual method steps A to F for producing a shaped plastic part 1 in one embodiment.

The first stamping film 14 with the first decorative ply 16 is arranged in or introduced into a cavity 56 of an injection mold 50 in method step A. The cavity 56 is formed by a first mold half 52 of the injection mold 50 and a second mold half 54 of the injection mold 50. In method step B the injection mold 50 is closed and the first stamping film 14 is back injection molded with a plastic compound at least in regions. After the join between the first stamping film 14 and the plastic compound or injection-molded part 12 has been brought about, a carrier ply of the first stamping film 14 is preferably detached from the first decorative ply 16 or from the injection-molded part 12. Method step C shows the manufactured plastic intermediate product 10.

Instead of the plastic intermediate product 10 being produced with the IMD method (method steps A and B), the plastic intermediate product can also be produced with the second method 300 represented in FIG. 2. The injection-molded part 12 is produced here in a first step and the decoration with a first stamping film 14 is effected in a separate, subsequent step.

In FIG. 4 the second stamping film 18 with the second decorative ply 20 is provided in method step D, wherein the second stamping film 18 is arranged in particular over at least the second region of surface 24 of the injection-molded part 12.

In method steps E' and E″ the second stamping film 18 is hot stamped onto the plastic intermediate product 10. In method step E' the stamping is effected by means of roll-on stamping with a hot-stamping wheel 58. In method step E″ the stamping is effected by means of roll-on stamping with a hot-stamping punch 60. The hot-stamping wheel 58 or the hot-stamping punch 60 are preferably at least as wide as the second region of surface 24 or the cylindrical lateral surface of the injection-molded part 12. In particular, the hot-stamping wheel 58 or the hot-stamping punch 60 is slightly wider, with the result that due to the stamping pressure the hot-stamping wheel 58 or the hot-stamping punch 60 presses the second stamping film 18 around at least partially slightly beyond the edge of the cylindrical lateral surface or the second region of surface 24 of the injection-molded part 12. The stamping wheel 58 or the hot-stamping punch 60 can be formed of pliable silicone or plastic, in particular with a Shore A hardness of from 60 to 95, preferably from 75 to 90.

After a solid join between the second stamping film 18 and the injection-molded part 12 or plastic intermediate product 10 has been produced, a carrier ply of the second stamping film 18 is preferably detached. The finished shaped plastic part 1 having the injection-molded part 12 as well as the first decorative ply 16 and the second decorative ply 20 is thus preferably obtained (method step F). Preferably, the first decorative ply 16 decorates the top surface of the injection-molded part 12 and the second decorative ply 20 decorates the lateral surface of the injection-molded part 12.

LIST OF REFERENCE NUMBERS

1 shaped plastic part
10 plastic intermediate product
12 injection-molded part
14 first stamping film
16 first decorative ply
18 second stamping film
20 second decorative ply
22 first region of surface
24 second region of surface
26 seam region or overlap region of the decorative plies
28 top surface
30 base surface
32 lateral surface
50 injection mold
52 first mold half
54 second mold half
56 cavity
58 hot-stamping wheel
60 hot-stamping punch
100 providing a plastic intermediate product
101 providing a second stamping film
102 hot stamping second stamping film onto plastic intermediate product
200 first method
201 introducing first stamping film into cavity
202 back injection molding first stamping film
300 second method
301 producing injection-molded part
302 arranging the first stamping film
303 hot stamping first stamping film onto injection-molded part
W length of curvature
G length or diameter of base surface

The invention claimed is:

1. A method for producing a shaped plastic part having a decorated surface, comprising:
   arranging or introducing a first stamping film with a first decorative ply in or into a cavity of an injection mold,
   back injection molding the first stamping film with a plastic compound at least in regions, with the result that the first stamping film and/or the first decorative ply is/are joined to an injection-molded part at least in a first region of surface of the injection-molded part to form a plastic intermediate product,
   providing a second stamping film with a second decorative ply, hot stamping the second stamping film onto the plastic intermediate product in at least a second region of surface of the injection-molded part.

2. The method according to claim 1, wherein the second stamping film or the second decorative ply of the second stamping film is applied to the plastic intermediate product in such a way that the second stamping film or the second decorative ply directly adjoins the first decorative ply.

3. The method according to claim 1, wherein the second stamping film or the second decorative ply is applied to the plastic intermediate product in such a way that the second stamping film or the second decorative ply overlaps the first decorative ply in regions.

4. The method according to claim 3, wherein the second stamping film or the second decorative ply overlaps the first decorative ply by at most 5 mm.

5. The method according to claim 1, wherein the injection-molding process or the back injection molding is effected at a temperature of from 180° C. to 350° C.

6. The method according to claim 1, wherein the injection-molding process or the back injection molding is effected under an injection pressure of from 800 bar to 3000 bar.

7. The method according to claim 1, wherein the injection-molding process or the back injection molding is effected for an injection time of from 0.5 seconds to 30 seconds.

8. The method according to claim 1, wherein the hot stamping is effected at a stamping temperature of from 80° C. to 250° C.

9. The method according to claim 1, wherein the hot stamping is effected under a stamping pressure of from 1 N/mm² to 10 N/mm², and/or with a stamping force of from 1000 N to 10,000 N.

10. The method according to claim 1, wherein the hot stamping is effected at a stamping speed of from 1 m/min to 10 m/min.

11. The method according to claim 1, wherein the first and/or second stamping film has a carrier ply, wherein the carrier ply has a layer thickness of from 6 μm to 250 μm.

12. The method according to claim 11, wherein the carrier ply of the first and/or of the second stamping film is detached from the first or second decorative ply, after the first decorative ply has been securely joined to the injection-molded part at least in regions or after the second decorative ply has been securely joined to the plastic intermediate product or the injection-molded part at least in regions.

13. The method according to claim 1, wherein the first and/or second stamping film has a detachment layer, wherein the detachment layer has a layer thickness of from 0.001 μm to 1 μm.

14. The method according to claim 1, wherein the first and/or second decorative ply has a metallization, wherein the metallization has a layer thickness of from 5 nm to 100 nm.

15. The method according to claim 1, wherein the decorative plies are formed identical.

16. The method according to claim 1, wherein the injection-molded part is formed substantially cylindrical.

17. The method according to claim 1, wherein at least one top surface and/or one base surface of the injection-molded part is decorated with the first decorative ply at least in regions.

18. The method according to claim 1, wherein at least one region of a lateral surface of the injection-molded part is decorated with the second decorative ply.

19. A method for producing a shaped plastic part having a decorated surface, comprising:
providing a plastic intermediate product having an injection-molded part and at least a first decorative ply, wherein the first decorative ply is arranged at least in a first region of surface of the injection-molded part,
providing a second stamping film with a second decorative ply,
hot stamping the second stamping film onto the plastic intermediate product in at least a second region of surface of the injection-molded part,
wherein the second stamping film or the second decorative ply of the second stamping film is applied to the plastic intermediate product in such a way that the second stamping film or the second decorative ply directly adjoins the first decorative ply, and
wherein the plastic intermediate product is produced by at least the following steps:
arranging or introducing a first stamping film with the first decorative ply in or into a cavity of an injection mold,
back injection molding the first stamping film with a plastic compound at least in regions, with the result that the first stamping film and/or the first decorative ply is/are joined to the injection-molded part at least in the first region of surface of the injection-molded part.

* * * * *